(12) United States Patent
Tatsumi

(10) Patent No.: US 7,936,473 B2
(45) Date of Patent: May 3, 2011

(54) PRINTING APPARATUS FOR PRINTING DATA ACQUIRED THROUGH DIGITAL BROADCASTING

(75) Inventor: Setuji Tatsumi, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1121 days.

(21) Appl. No.: 11/703,105

(22) Filed: Feb. 7, 2007

(65) Prior Publication Data
US 2007/0188801 A1    Aug. 16, 2007

(30) Foreign Application Priority Data
Feb. 8, 2006  (JP) ................................. 2006-031344

(51) Int. Cl.
G06F 15/00   (2006.01)
G06F 3/12    (2006.01)
G06K 1/00    (2006.01)

(52) U.S. Cl. ...................................... 358/1.15; 358/1.13
(58) Field of Classification Search .................. 358/1.15, 358/1.1, 1.13, 1.14
See application file for complete search history.

(56) References Cited

U.S. PATENT DOCUMENTS

| 7,595,902 B2 * | 9/2009 | Yamaguchi et al. ......... 358/1.15 |
| 2002/0060748 A1 | 5/2002 | Aratani et al. |
| 2002/0062487 A1 | 5/2002 | Ohno et al. |
| 2008/0100868 A1 * | 5/2008 | Okajima ..................... 358/1.16 |

FOREIGN PATENT DOCUMENTS

| JP | 2002-158976 A | 5/2002 |
| JP | 2002-158979 A | 5/2002 |
| JP | 2005-210408 A | 8/2005 |

* cited by examiner

*Primary Examiner* — Douglas Q Tran
(74) *Attorney, Agent, or Firm* — Birch, Stewart, Kolasch & Birch, LLP

(57) ABSTRACT

The printing apparatus prints data acquired through digital broadcasting. The printing apparatus is capable of being connected to a receiving apparatus through a network. The receiving apparatus receives the data transmitted through the digital broadcasting, and has a data storage device storing the received data. The printing apparatus includes: a user interface which is operated by a user of the printing apparatus; a list acquisition device which acquires a print content list through the network in accordance with an operation on the user interface, the print content list being stored in the data storage device; a list display device which displays the print content list acquired by the list acquisition device; and a print data acquisition device with which a print object content to be printed is selected from the print content list displayed on the list display device, and which acquires, through the network, print data of the print object content from the data storage device in accordance with an operation on the user interface. The printing apparatus prints the print data acquired by the print data acquisition device.

6 Claims, 11 Drawing Sheets

PRINTING APPARATUS FOR PRINTING DATA ACQUIRED THROUGH DIGITAL BROADCASTING

BACKGROUND OF THE INVENTION

1. Field of the Invention

The present invention relates to a printing apparatus for printing data acquired through digital broadcasting, and more particularly, to a printing apparatus that prints data stored in a digital broadcast receiving apparatus.

2. Description of the Related Art

In recent years, with the start of BS (Broadcasting Satellite) digital broadcasting, it has become necessary for digital television receiving apparatuses (hereinafter referred to as "DTV" or "DTV apparatus") to process non-TV-program data (i.e., data other than TV-program data) upon receiving such data. It has become possible to acquire "print data" relating to TV-programs in the form of non-TV-program data by the DTV apparatus, and to produce paper copies based on the print data with a printer connectable to the DTV apparatus. Specific examples of the print data include recipes from cookery programs, tourist guides relating to travel programs, and the like.

While a user, namely, a viewer is watching a TV-program, print contents and a print button are displayed on the screen as and when necessary, and setting information such as paper size and number of sheets required is simultaneously displayed. In this state, the viewer refers to the display and presses the print button, and print data is then transmitted to the printer from the DTV apparatus and printing is carried out.

Although there may be a case where the viewer does not know the print contents on the DTV apparatus since the printing is carried out with the printer, the viewer is usually able to determine the print contents from what the program is associated with if the viewer is viewing the program, and the problem of printing unintended contents, or the like, can be prevented even in cases where the ultimate print contents cannot be ascertained.

When the printing with the printer is instructed, the DTV apparatus needs to be in connection with the printer, and the printer needs to be completely provided with paper, ink cartridges, and the like. If there is a problem in any of these items, then it is not possible to start printing. Furthermore, there are also cases where the user may wish to carry out printing later. In such cases, the print data is temporarily saved, and the printing is carried out after the preparations of the printer are completed.

However, if printing is carried out after temporarily saving the data, then as described above, there may be a case where the user does not know the print contents on the DTV apparatus, and there may be a case where the user cannot remember the print setting information having been displayed during the program, due to the passage of time. Consequently, tasks such as selecting the print objects may become difficult.

The following methods have been proposed in order to eliminate the above-described problems.

Japanese Patent Application Publication No. 2002-158976 discloses a method in which the user is informed of the existence of print contents, information such as the paper required to print the contents is also notified to the user through the DTV apparatus, and the user is prompted to carry out the preparations necessary for the printing.

Japanese Patent Application Publication No. 2002-158979 discloses a method in which a state of the printer is monitored through the DTV apparatus, and the user can be informed of progress of print processing or abnormal status of the print processing through the screen of the DTV apparatus.

Japanese Patent Application Publication No. 2005-210408 discloses a method in which print contents are stored in association with captured image data of the display screen, and the print contents thus stored in a storage device is printed. In this method, the storage device is arranged in the DTV apparatus, and the printing operation is controlled by the DTV apparatus.

However, in the methods described in Japanese Patent Application Publication Nos. 2002-158976, 2002-158979 and 2005-210408, the printing operation is controlled through the DTV apparatus or the status of the printer is displayed on the screen of DTV apparatus. Then, the user must travel between the DTV apparatus and the printer, and the task of printing, or the like, is inconvenient if the DTV apparatus and the printer are situated separately. Moreover, the DTV apparatus is originally intended for the purpose of enjoying moving pictures, and hence, if a message, such as a print error message, is unexpectedly displayed on the screen while the viewer is watching moving pictures, then the viewer will not be able to concentrate on viewing the moving pictures. Consequently, this obstructs the original object of viewing moving pictures for which the DTV apparatus is especially designed. Furthermore, in cases where a user wishes to perform printing and another user wishes to enjoy watching a program with the same DTV apparatus, there is a problem in that both of these wishes cannot be satisfied at the same time.

SUMMARY OF THE INVENTION

The present invention has been contrived in view of the foregoing circumstances, an object thereof being to provide a printing apparatus for printing data obtained through digital broadcasting, the printing apparatus being capable of printing the data acquired by a DTV apparatus, simply, without obstructing the viewing of the DTV apparatus.

In order to attain the aforementioned object, the present invention is directed to a printing apparatus for printing data acquired through digital broadcasting, the printing apparatus capable of being connected to a receiving apparatus through a network, the receiving apparatus receiving the data transmitted through the digital broadcasting and having a data storage device storing the received data, the printing apparatus comprising: a user interface which is operated by a user of the printing apparatus; a list acquisition device which acquires a print content list through the network in accordance with an operation on the user interface, the print content list being stored in the data storage device; a list display device which displays the print content list acquired by the list acquisition device; and a print data acquisition device with which a print object content to be printed is selected from the print content list displayed on the list display device, and which acquires, through the network, print data of the print object content from the data storage device in accordance with an operation on the user interface, wherein the printing apparatus prints the print data acquired by the print data acquisition device.

According to this aspect of the present invention, it is possible to print by means of operations on the printing apparatus only, without obstructing the viewing of the DTV apparatus.

Preferably, the list acquisition device acquires detailed data for each print content contained in the print content list; and the list display device displays the detailed data acquired by the list acquisition device.

According to this aspect of the present invention, since the user is able to ascertain the details of the contents prior to printing, it is possible to prevent printing of unintended contents.

Preferably, when the print data acquired by the print data acquisition device has been normally printed, information that printing has been normally carried out is sent to the receiving apparatus.

According to this aspect of the present invention, a printing state can be readily judged, when a print content that has been printed is printed again. For example, it can be easily judged whether or not the print content has already been printed. Moreover, in cases of print contents requiring fees, the charging operation can be carried out through the DTV apparatus.

Preferably, the print content list is selectively displayed on the list display device in accordance with attribute data of the print content.

According to this aspect of the present invention, it is possible to retrieve only the print content that is required to be printed.

Preferably, the printing apparatus is authenticated by the receiving apparatus.

According to this aspect of the present invention, it is possible to prevent exchange of information through a neighboring network, even if the network circuit uses wireless communication. Moreover, it is possible to restrict acquiring information in cases of printing contents requiring fees (paid-for contents).

Preferably, communication between the printing apparatus and the receiving apparatus is started when the list acquisition device sends a signal to acquire the print content list to the receiving apparatus.

According to this aspect of the present invention, it is possible to prevent meaningless (needless) warnings when the printing apparatus is used alone.

Preferably, if communication between the printing apparatus and the receiving apparatus is in an abnormal state when the list acquisition device sends a signal to acquire the print content list to the receiving apparatus, then the printing apparatus outputs information of abnormality of the communication.

According to this aspect of the present invention, it is possible to prevent meaningless (needless) warnings, such as a reminder to switch on the power to the DTV apparatus, when the printing apparatus is used for other purposes.

The printing apparatus for printing data acquired through digital broadcasting according to the present invention has beneficial effects in that information acquired through the DTV apparatus can be printed easily, without obstructing the viewing of the DTV apparatus.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
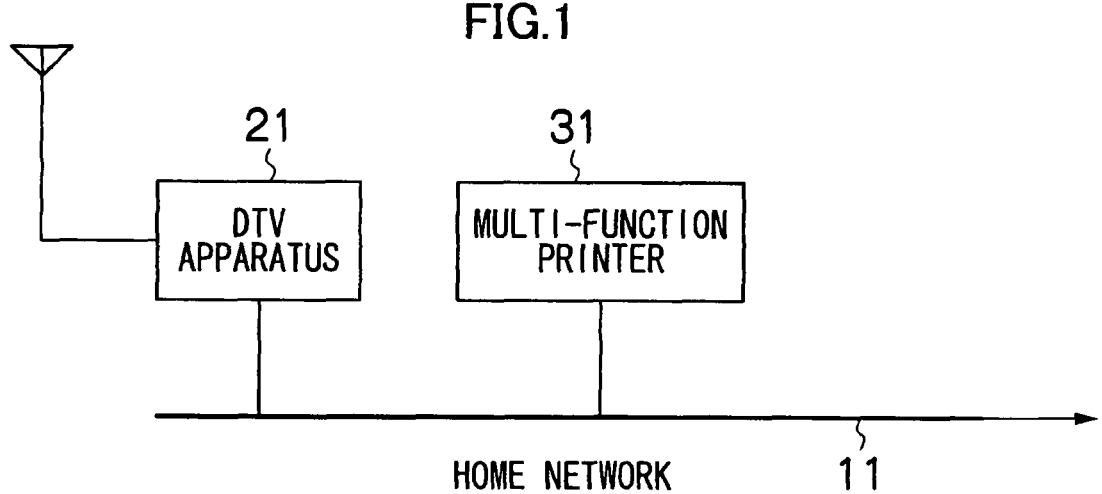
FIG. 1 is a block diagram showing the system composition including a printing apparatus for printing data acquired through digital broadcasting and a DTV apparatus according to an embodiment of the present invention.

FIG. 1 is a diagram showing the overall system including a printing apparatus for printing data acquired through digital broadcasting according to a first embodiment of the present invention. As shown in FIG. 1, in this system, a DTV apparatus 21 serves as a receiving apparatus that receives a television signal from a broadcasting station, then displays video images, sound and operation data, and the like, and has an audio output section and a data storage unit forming a data storage device that stores acquired information as described below.

The DTV apparatus 21 is in connection with a multi-function printer 31 through a home network 11, which is a network circuit, thereby creating a state where communication and controlling between the DTV apparatus 21 and the multi-function printer 31 can be implemented. The multi-function printer 31 serves as a printing apparatus for printing data acquired through digital broadcasting. Moreover, a personal computer (PC) (not shown) or the like may be connected to this home network 11, and in this case, it is possible to perform communication and controlling between the multi-function printer 31 and the PC, and between the DTV apparatus 21 and the PC.

Figure 2:
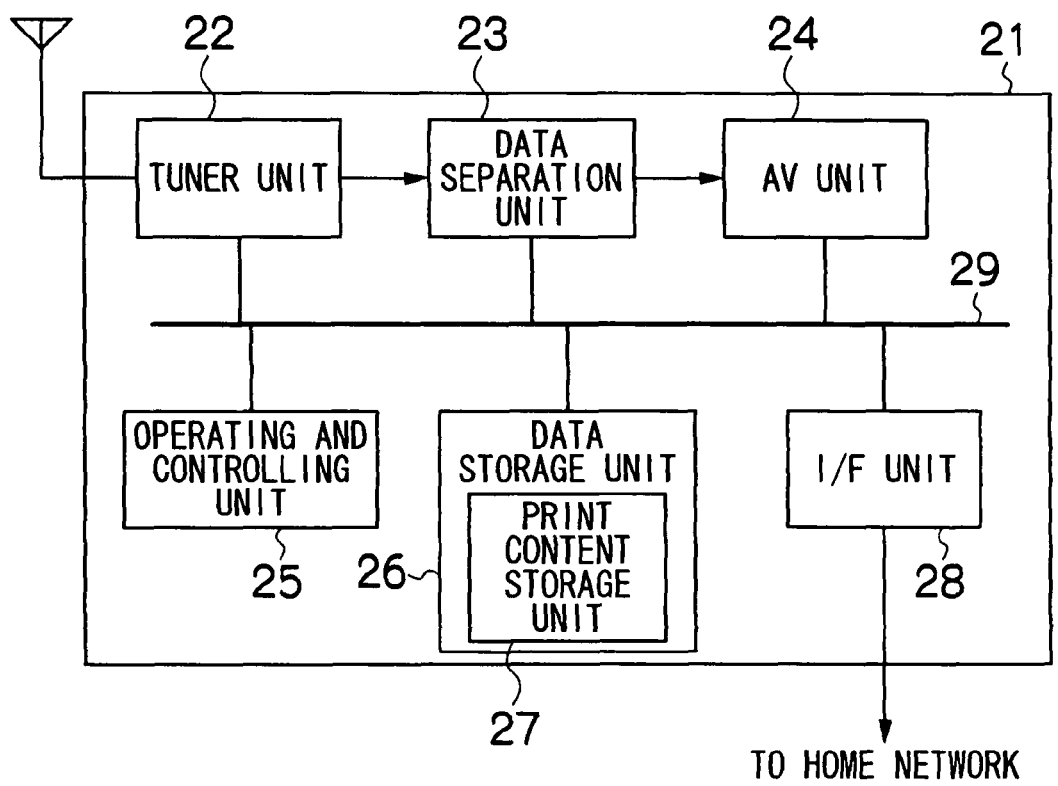
FIG. 2 is a block diagram showing the internal composition of the DTV apparatus connected to the printing apparatus.

FIG. 2 is a diagram showing the DTV apparatus 21 according to the first embodiment. The DTV apparatus 21 is constituted by several sections in order to achieve the functions of the DTV apparatus 21. A tuner unit 22 selects a desired reception frequency from the received high-frequency digital broadcast TV signals, amplifies the TV signal, and demodulates the transport stream (TS) data composed of video/audio data and other various types of data.

A data separation unit 23 is a circuit for separating the TS data into video/audio program data, program information data, program control document data, print data, and other datacasting data. The video/audio program data is sent to an AV unit 24 described later, and the other data, namely, the program information data, the program control document data, the print data and the other datacasting data, are sent to and stored in a memory unit (not shown).

In order to display video images and to output sound, the AV unit 24 firstly separates the received signals into a video signal and an audio signal, by means of a broadcast video/audio data decoding unit.

The audio signal is synthesized and adjusted to control the volume, quality, presence, and other aspects, of the output sound, and is amplified and then applied to speakers (not shown) to be outputted as the sound. The video signal is synthesized and subjected to conversion, correction, and the like, to control the size, brightness, and other aspects, of the image to be displayed, and is then sent to a display apparatus (not shown), such as a monitor, to be displayed as the image.

The AV unit 24 may receive signals through an internal bus 29, as well as the signals sent from the data separation unit 23, and the signals received through the internal bus 29 are also subjected to similar processing in the AV unit 24 and are outputted through the speakers and the monitor.

An operating and controlling unit 25 is operated by the TV viewer, and the operating and controlling unit 25 serves to control universally all of the sections in the DTV apparatus 21. The operating and controlling unit 25 is constituted by a CPU, memory, bus control unit, program storage unit, parameter control unit, ID storage unit, clock unit (all of which are not shown), and the like.

A data storage unit 26 is constituted by a rewriteable non-volatile memory and/or an auxiliary storage device, such as a hard disk apparatus, or the like. The data storage unit 26 stores the program information data, program reproduction document, print data, and the other datacasting data separated by the data separation unit 23. The data storage unit 26 also stores data captured by the AV unit 24, fee payment control data, TV viewer's viewing history data, and the like, as and when required, in accordance with instructions from the TV viewer or instructions issued by the operating and controlling unit 25. The data storage unit 26 is provided with a print content storage unit 27, which is used for separately storing information relating to the print contents, and the like.

An interface (I/F) unit 28 is a circuit for connecting to the multi-function printer 31 shown in FIG. 1, and the like, through the home network 11. The I/F unit 28 is controlled by the operating and controlling unit 25 of the DTV apparatus 21, and the DTV apparatus 21 outputs the print data to the external apparatus through the home network 11. The I/F unit 28 is also used when the DTV apparatus 21 is transmitting or receiving various types of data, such as when it is connected to the broadcasting station management server, when it is connected to the Internet, or when controlling charges for pay-per-view programs. The received data is stored in the data storage unit 26 according to requirements.

When receiving a TV signal using the DTV apparatus 21 having the composition described above, signal processing is carried out by the tuner unit 22 and the data separation unit 23. A channel is selected by the operating and controlling unit 25 in accordance with instructions from the TV viewer, and the broadcast waves of corresponding frequencies are received and the TS data is demodulated. Then, the data separation unit 23 separates the TS data into program data, program information data, print data, datacasting data, and the like. The program data is supplied to the AV unit 24, and is then presented to the TV viewer as audio information and image information through the speakers and the monitor. Moreover, the program information data, print data, datacasting data, and the like, are stored in the data storage unit 26, as and when required, through the internal bus 29. The DTV apparatus 21 is provided with the common bus 29, through which various data is transmitted inside the DTV apparatus 21.

Figure 3:
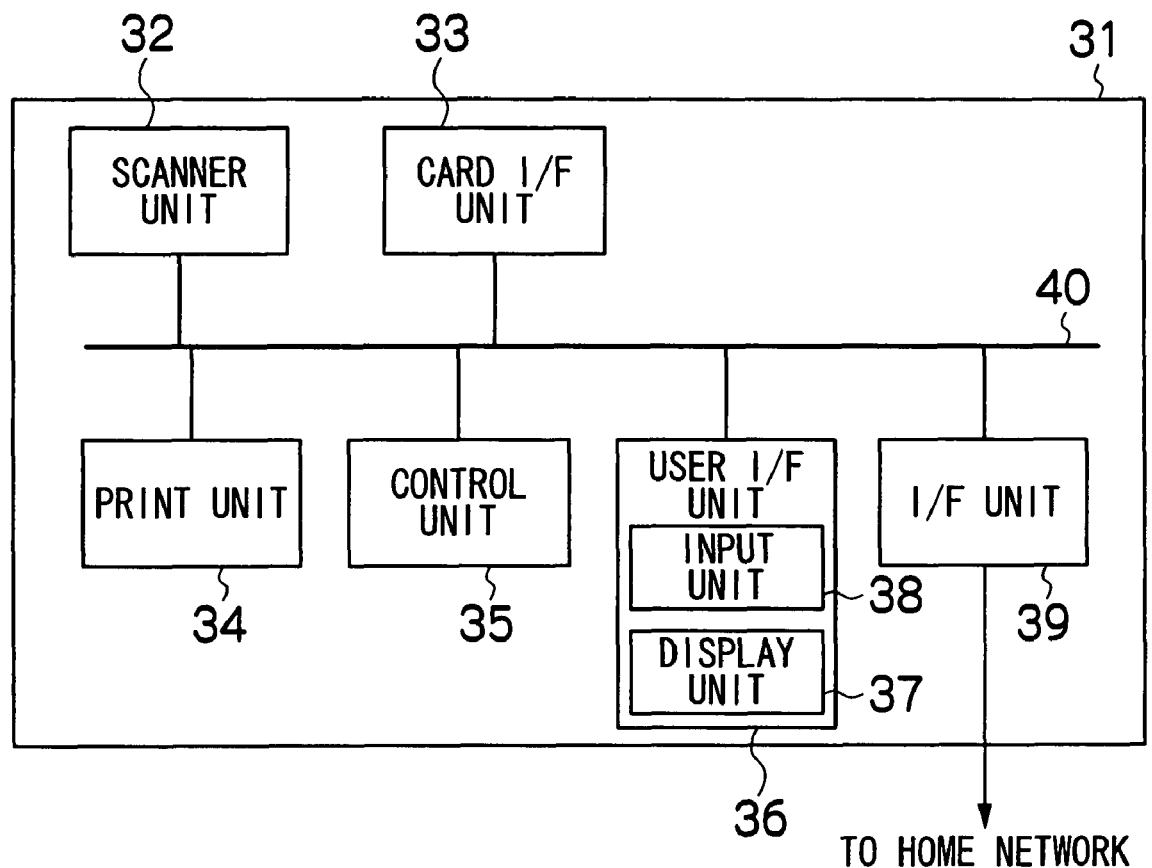
FIG. 3 is a block diagram showing the internal composition of the printing apparatus.

FIG. 3 is a diagram showing the composition of the multi-function printer 31 according to the first embodiment.

The multi-function printer 31 has a scanner unit 32, through which images can be captured, and a card I/F unit 33, and the multi-function printer 31 can acquire image data other than the data inputted through the home network 11.

A print unit 34 has a function for printing an image in accordance with the print data received through the home network 11 or acquired through the scanner unit 32 or the card I/F unit 33, and the print unit 34 prints the images by means of an inkjet method or an electrophotographic method.

The control unit 35 controls the whole of the multi-function printer 31, and has functions for instructing the start of printing by the print unit 34 and acquiring print data through the home network 11, more specifically, acquiring information relating to the print contents stored in the print content storage unit 27 of the data storage unit 26 in the DTV apparatus 21, in accordance with instructions from the TV viewer, and the like, as described below.

The user I/F unit 36 serves to exchange information between the TV viewer and the multi-function printer 31. The user I/F unit 36 has a display unit 37, which enables showing information provided by the multi-function printer 31 to the TV viewer, and has an input unit 38 for transmitting instructions from the TV viewer to the multi-function printer 31. The multi-function printer 31 is controlled by the control unit 35 in accordance with the input information from the input unit 38.

An I/F unit 39 is a circuit for connecting to the DTV apparatus 21 shown in FIG. 1, or the like, through the home network 11. The I/F unit 39 has a function of transmitting instruction information from the control unit 35, or the like, to the DTV apparatus 21 through the home network 11, and a function of inputting information from the DTV apparatus 21 to the multi-function printer 31 through the home network 11.

The multi-function printer 31 is provided with a common bus 40, through which various data is transmitted inside the multi-function printer 31.

Next, an interface panel of the user I/F unit 36 of the printing apparatus for printing data acquired through digital broadcasting according to the first embodiment is described. Control operations made by the TV viewer and information presented from the multi-function printer 31 to the TV viewer are displayed on the interface panel of the user I/F unit 36 of the multi-function printer 31.

Figure 4:
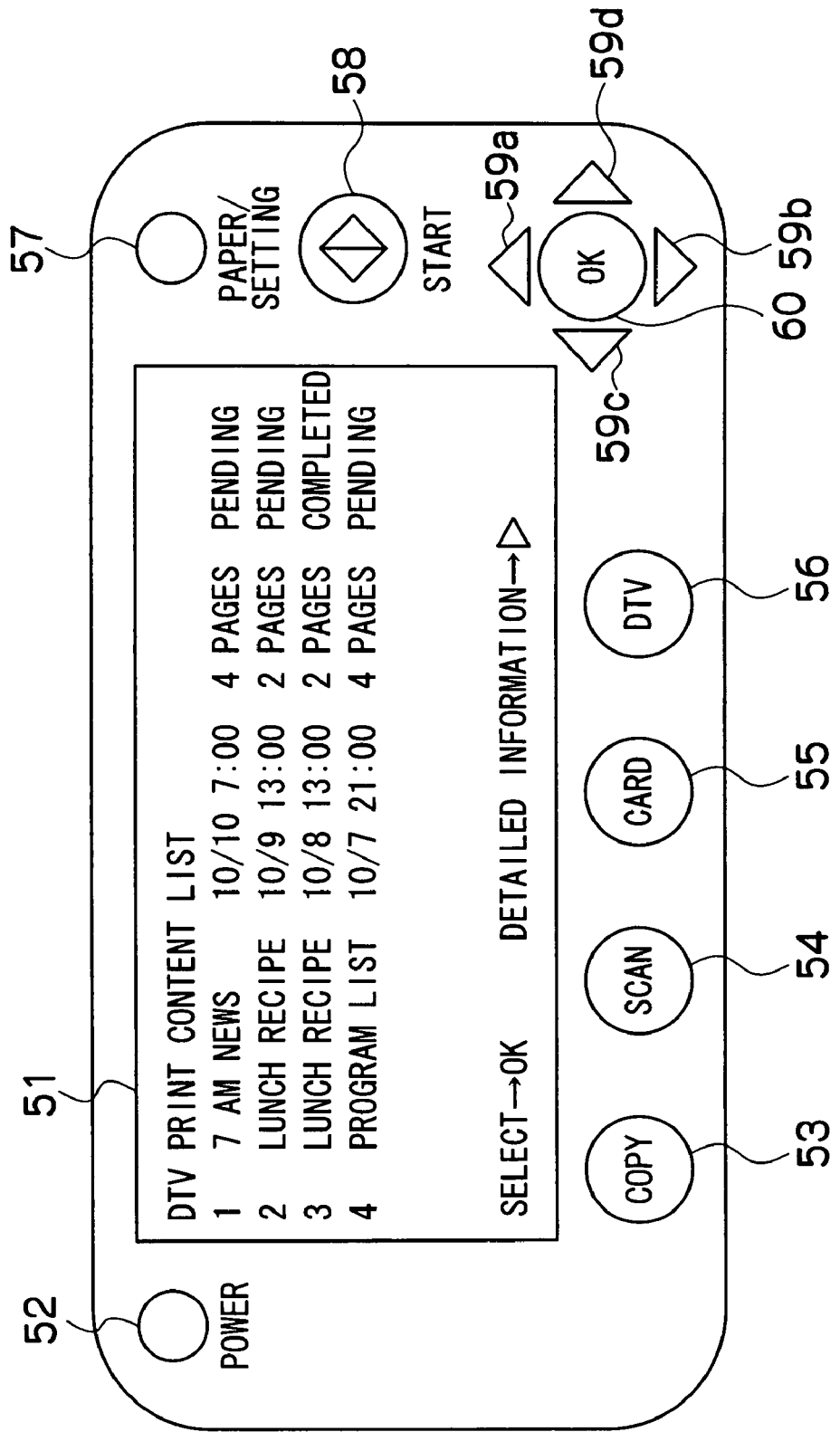
FIG. 4 is a schematic drawing showing a state of an interface panel of the printing apparatus, after a print content list has been acquired.

FIG. 4 is a diagram showing the interface panel of the user I/F unit 36 of the multi-function printer 31.

The interface panel of the user I/F unit 36 shown in FIG. 4 includes the display unit 37 and the input unit 38. The display unit 37 has a display screen 51 composed of a liquid crystal display panel, or the like, and shows various types of information relating to the multi-function printer 31. The input unit 38 includes a power button 52, a copy button 53, a scan button 54, a card button 55, a DTV button 56, a paper/setting button 57, a start button 58, item movement buttons 59a, 59b, 59c and 59d, with which selected items can be switched upwards, downwards, leftwards or rightwards, and an OK button 60, with which the wish to confirm settings is indicated.

The power button 52 is used for switching the power to the multi-function printer 31 on and off. By pressing the power button 52, the power supply switches on, and the multi-function printer 31 starts up.

The copy button 53 is used for starting an operation whereby an image is captured through the scanner unit 32 of the multi-function printer 31, and the print unit 34 copies the captured image onto a recording medium, such as paper.

The scanner button 54 is used for starting an operation whereby an image is captured through the scanner unit 32 of the multi-function printer 31, and the data of the captured image is transferred to the PC (not shown), or the like, through the home network.

The card button 55 is used for starting an operation whereby information is read in from cards of various types on which the information is recorded electrically or magnetically, by means of the card I/F unit 33 of the multi-function printer 31, and the print unit 34 produces a copy based on the read data onto a recording medium, such as paper. Here, the "card" is a removable card used for recording image data, such as a digital camera card, and the card stores the data with a semiconductor recording device such as a flash memory, a magnetic recording medium, or the like.

The DTV button 56 is used for starting a connection from the multi-function printer 31 to the DTV apparatus 21 through the home network 11. Specific details are described hereinafter with reference to a flowchart.

The paper/setting button 57 is used for setting the paper to be used in the multi-function printer 31 and setting the functions. By pressing the paper/setting button 57, information relating to the setting information is displayed on the display screen 51. The user operates the item movement buttons 59a, 59b, 59c and 59d, and the OK button 60, on the basis of the information displayed on the display screen 51, thereby setting the multi-function printer 31 to a desired state. By pressing the paper/setting button 57, the information set with the item movement buttons 59a, 59b, 59c and 59d, and the OK button 60 is then stored in the control unit 35 of the multi-function printer 31.

The start button 58 is used for starting printing of desired print contents, or the like, with the multi-function printer 31. More specifically, by pressing the start button 58, information indicating that the start button 58 has been pressed is transmitted to the control unit 35 through the common bus 40. The control unit 35 then sends image data of the printing object to the print unit 34 through the common bus 40, and the prescribed image that has been selected is printed onto the recording medium, such as paper, by the print unit 34.

The item movement buttons 59a, 59b, 59c and 59d are used for switching items selected from the various items displayed on the display screen 51 concerning the information displayed on the display screen 51. Four item movement buttons 59a, 59b, 59c and 59d are arranged for the up, down, left and right directions, in order to move upwards, downwards, leftwards and rightwards on the display screen 51. The OK button 60 is used for indicating a desire to confirm the information selected with the item movement buttons 59a, 59b, 59c and 59d on the display screen 51. The selection of the print information, setting information and other types of information displayed on the display screen 51 is set by operating the item movement buttons 59a, 59b, 59c and 59d, and the OK button 60.

Next, the sequence of processing for printing by the printing apparatus for printing data acquired through digital broadcasting according to the first embodiment is described with reference to FIG. 5.

In the first embodiment, the procedure starts from a state where the power supply to the multi-function printer 31 has already been switched on.

Figure 5:
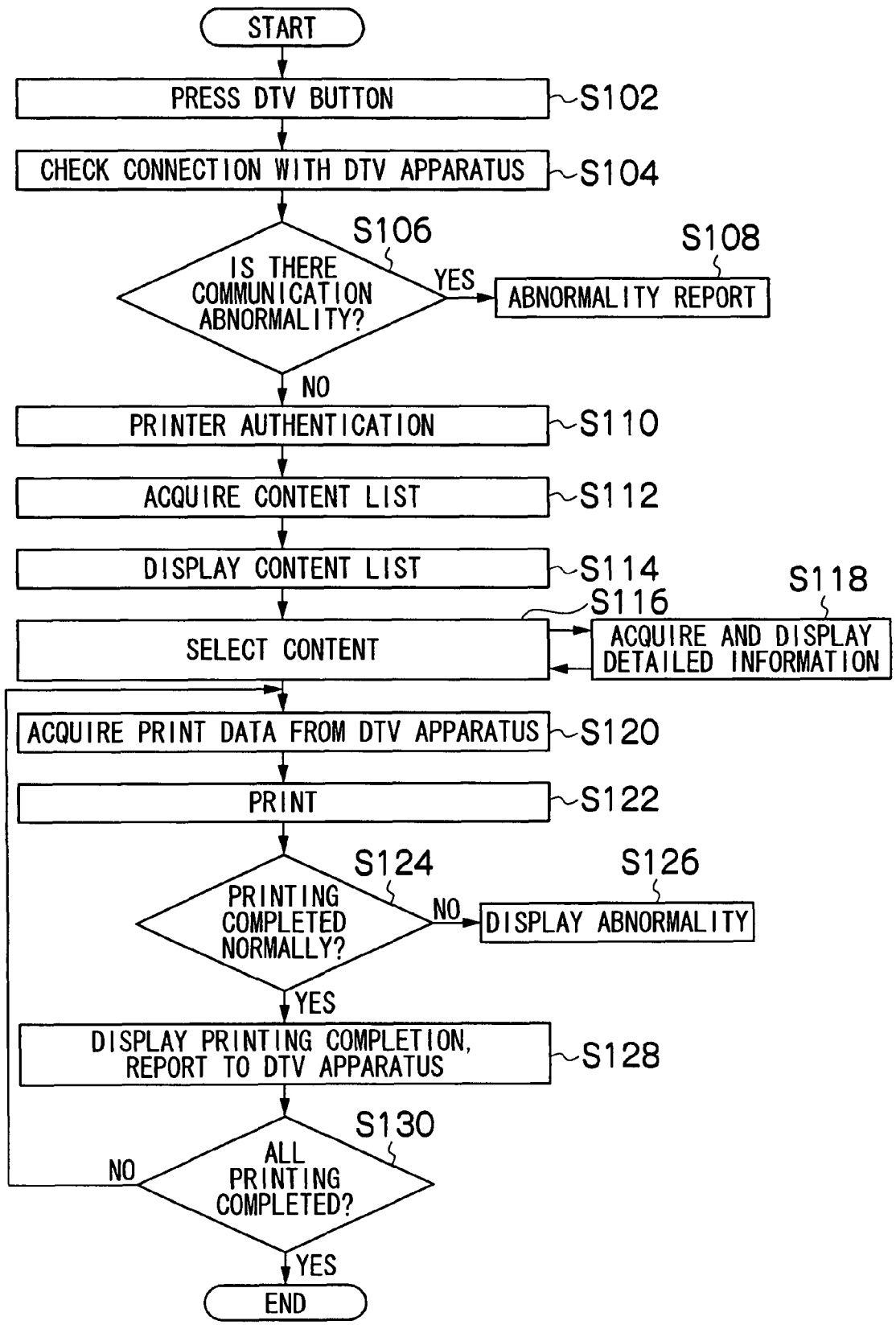
FIG. 5 is a flowchart of a printing operation in the printing apparatus.

In this state, at step S102 in FIG. 5, the DTV button 56 on the interface panel of the multi-function printer 31 is pressed.

When the DTV button 56 is pressed, a confirmation task is carried out by the control unit 35 of the multi-function printer 31 through the I/F unit 39, in order to check that the multi-function printer 31 is in connection with the DTV apparatus 21 on the home network 11, as indicated in step S104.

Thereupon, at step S106, it is judged whether or not the communication status is abnormal. If there is a communication abnormality, such as an abnormality in the connection with the DTV apparatus 21, then a "communication abnormality present" judgment is made and the procedure transfers to step S108, where the existence of the abnormality is reported on the display unit 37 of the multi-function printer 31. For example, this applies to cases where the DTV apparatus 21 is not in connection to the home network 11, or cases where the power supply of the DTV apparatus 21 is switched off.

On the other hand, if it is judged at step S106 that there is no abnormality in the connection with the DTV apparatus 21, then it is determined that there is "no communication abnormality" and the procedure transfers to step S110.

At step S110, an authentication procedure is carried out for the multi-function printer 31. The purpose of carrying out the authentication procedure is to limit the usable printer in order to restrict the use of paid-for contents, and in cases where the home network 11 includes a wireless connection rather than a wired connection, to prevent interference with neighboring home network circuits, in other words, to prevent the DTV apparatus 21 of the TV viewer from connecting mistakenly to another multi-function printer in a neighboring house. Registration of the printer for the purpose of authentication is carried out by the DTV apparatus 21. More specifically, when the DTV apparatus 21 and the multi-function printer 31 are initially connected to each other through the home network 11, a test print is carried out by the multi-function printer 31, and after confirming that there is no problem in the results of the test print, hardware information relating to the multi-function printer 31, for example, the MAC (Media Access Control) address, is registered in the DTV apparatus 21.

Thereupon, at step S112, a print content list in the DTV apparatus 21 is acquired by the multi-function printer 31 by means of a list acquisition device. More specifically, a control signal for acquiring the list of print contents stored in the print content storage unit 27 of the DTV apparatus 21 is transmitted from the control unit 35 of the multi-function printer 31 to the DTV apparatus 21 through the I/F unit 39 of the multi-function printer 31 and the home network 11. The control signal transmitted to the DTV apparatus 21 is inputted to the I/F unit 28 of the DTV apparatus 21, and is then sent to the print content storage unit 27 in the data storage unit 26 through the common bus 29. Thereupon, designated print content list information stored in the print content storage unit 27 is read out and transmitted to the home network 11 through the common bus 29 and the I/F unit 28.

Figure 6:
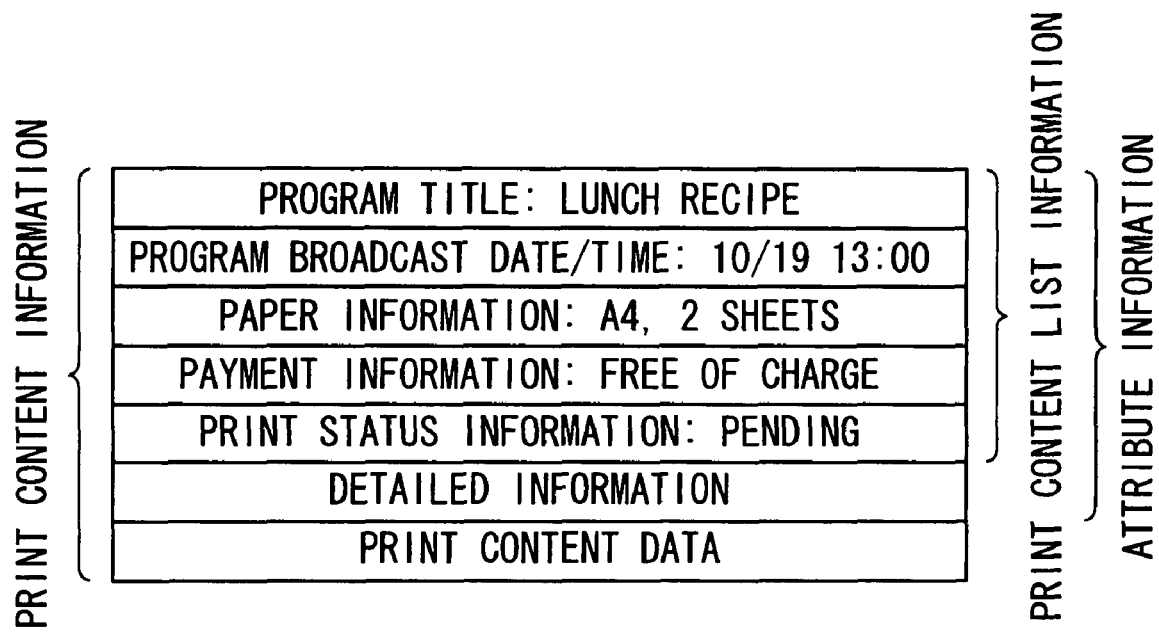
FIG. 6 is an illustrative diagram showing the composition of print content information stored in a print content storage unit of the DTV apparatus.

FIG. 6 is a diagram showing a file structure of print content information stored in the print content storage unit 27. As shown in FIG. 6, the print content information includes attribute information and print content data. More specifically, the attribute information includes print content list information such as the program title, the program broadcast date and time, paper information, payment information, and information indicating whether or not the content has been printed, as well as detailed information that reminds the user of the subject matter of the print content. Of these pieces of information, only the desired print content list information is readout and transmitted. The print content list information transmitted to the home network 11 is read in to the multi-function printer 31 through the I/F unit 39 of the multi-function printer 31.

Thereupon, the procedure transfers to step S114 in FIG. 5, and a list display device displays the acquired print content list on the display screen 51. More specifically, the print content list acquired by the multi-function printer 31 is sent to the user I/F unit 36 through the common bus 40, and then displayed on the display screen 51 on the display unit 37 of the interface panel. FIG. 4 shows the interface panel in this state. As shown in FIG. 4, the display screen 51 displays information relating to the print content list acquired from the print content storage unit 27 of the DTV apparatus 21. The information displayed here contains the program title, the broadcast date and time, the number of sheets of paper required if printing is to be carried out, and information indicating whether or not printing has already been carried out.

Figure 7:
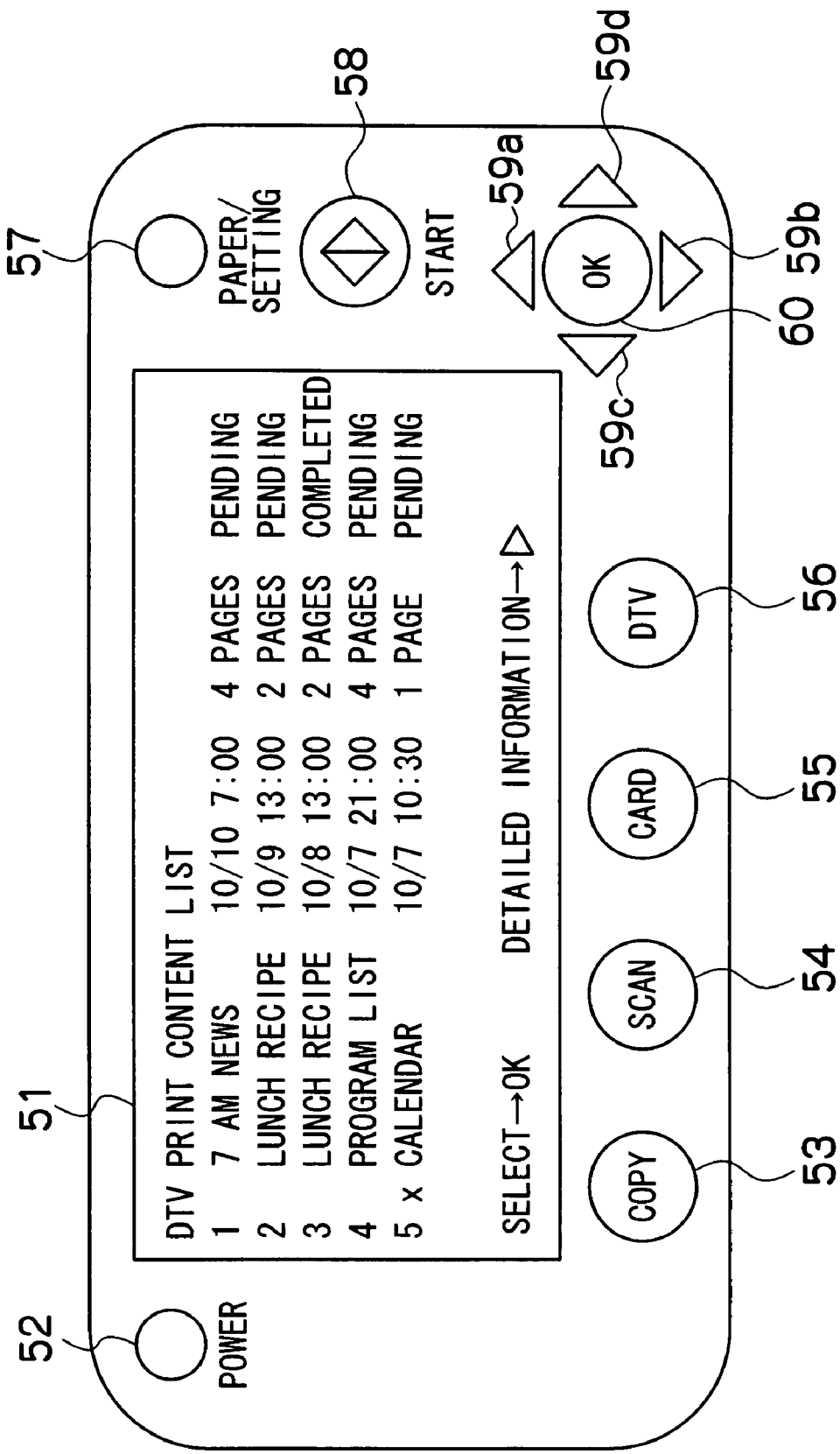
FIG. 7 is a schematic drawing showing a state of a further embodiment of the interface panel of the printing apparatus, after a print content list has been acquired.

Moreover, an item that cannot be printed by the multi-function printer 31 being used, due to the attributes of the print content acquired from the print content storage unit 27 of the DTV apparatus 21, is separately displayed. FIG. 7 is a diagram showing the interface panel in this state. As shown in FIG. 7, an "X" symbol is placed by item "5", and this indicates that printing is not possible with the multi-function printer 31 used at present. An example of a case where printing is not possible is one where the print content requires a sheet of the A3 size but the multi-function printer 31 currently used accepts exclusively sheets of the A4 size.

Figure 8:
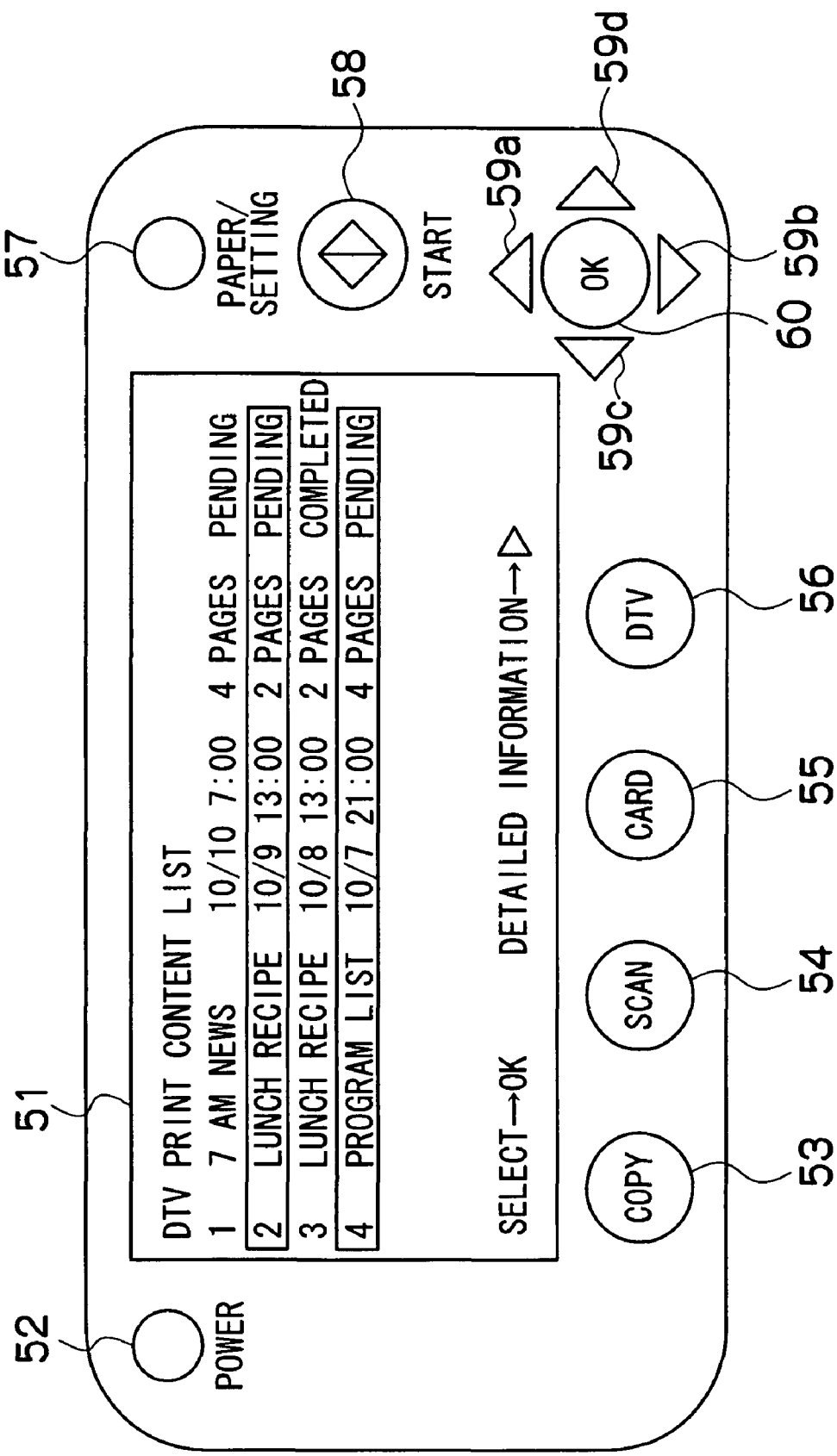
FIG. 8 is a schematic drawing showing a state of the interface panel of the printing apparatus, after print content items have been selected from the print content list.

Thereupon, at step S116, the print content is selected by the TV viewer. More specifically, the TV viewer selects the print content displayed on the display screen 51 by operating the item movement buttons 59a and 59b and the OK button 60. FIG. 8 is a diagram showing the state of the interface panel after this selection has been made. As shown in FIG. 8, frames are depicted about the print content items that are being selected.

If it is not necessary for the user to refer to the detailed information of the print content, then the user presses the start button 58, thereby transferring the procedure to step S120.

Figure 9:
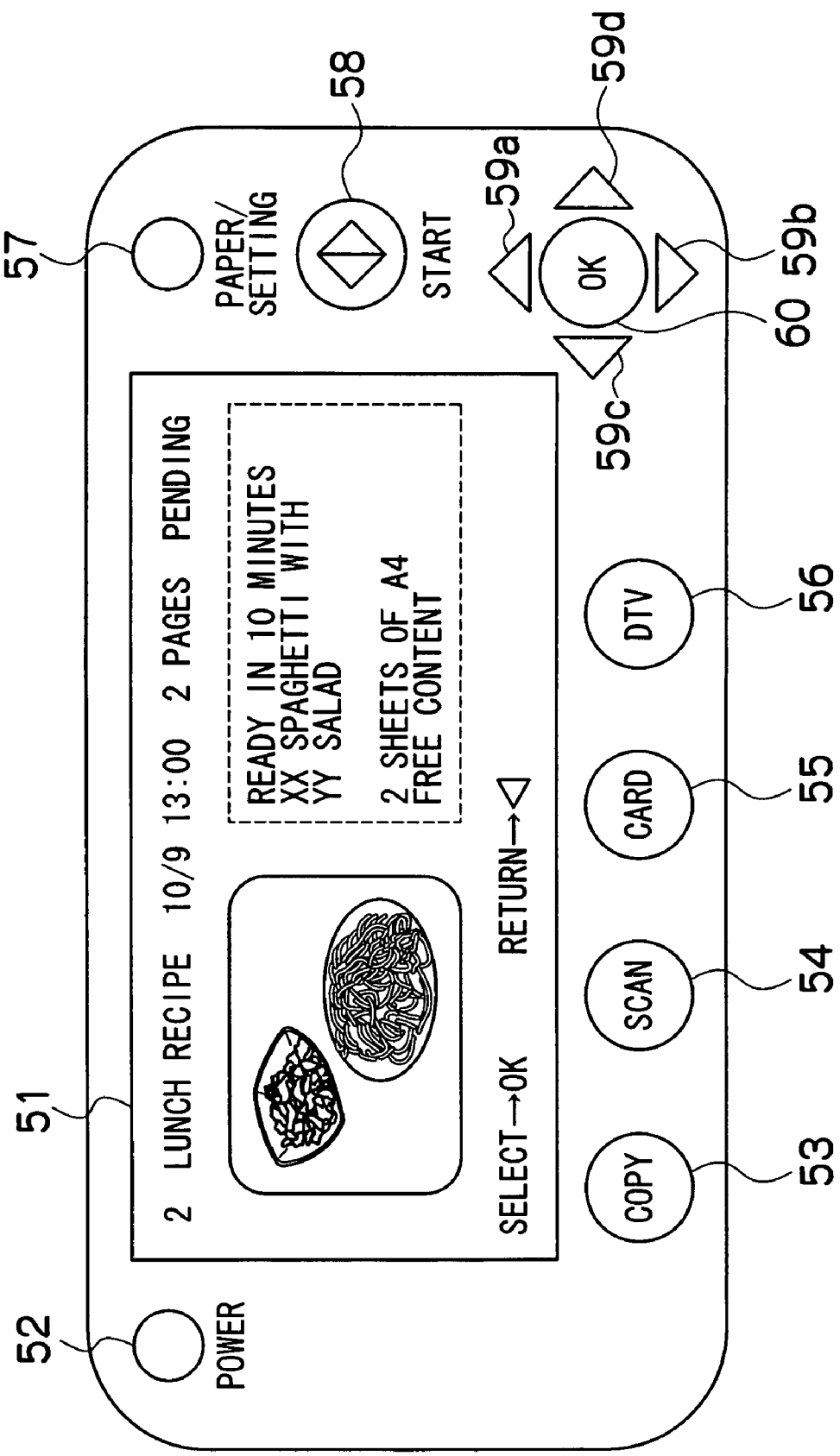
FIG. 9 is a schematic drawing showing a state of the interface panel of the printing apparatus, after print contents have been acquired.

On the other hand, if the user wishes to refer to the detailed information relating to the print content, then the user selects the print content item for which he or she wishes to refer to the detailed information, by operating the item movement buttons 59a and 59b on the screen at step S116, and then presses the item movement button 59d, thereby transferring the procedure to step S118. More specifically, the user selects the print content item for which he or she wishes to refer to the detailed information, by operating the item movement buttons 59a and 59b, and presses the item movement button 59d, then a signal of instruction for displaying related information containing the detailed information, is sent to the control unit 35 through the common bus 40. The control unit 35 then issues a control signal for obtaining information relating to the print content for which the detailed information is to be referred to, from the print content storage unit 27 of the DTV apparatus 21. This control signal is transmitted from the control unit 35 of the multi-function printer 31 through the common bus 40, the I/F unit 39 and the home network 11, and is inputted to the DTV apparatus 21 through the I/F unit 28 of the DTV apparatus 21. The inputted control signal is sent through the common bus 29 in the DTV apparatus 21 to the print content storage unit 27 in the data storage unit 26. Thereupon, the selected information is retrieved from the related information (attribute information) of the print contents stored in the print content storage unit 27, and is transmitted through the common bus 29 and the I/F unit 28 of the DTV apparatus 21 to the home network 11. The related information (attribute information) of the selected print content thus transmitted to the home network 11 is inputted to the multi-function printer 31 through the I/F unit 39, and is sent through the common bus 40 to the display unit 37 of the user I/F unit 36, and then displayed on the display screen 51. FIG. 9 is a diagram showing the interface panel in this state.

As shown in FIG. 9, the display screen 51 displays the related information of the print content for which the user wishes to refer to the detailed information. Image information indicating the concrete state of the print content is displayed on the left-hand side of the display screen 51, and text-based information relating to the print content for which the user wishes to refer to the detailed information is displayed on the right-hand side of the display screen 51. In this way, the detailed information may include preview image data. This information has been stored in the print content storage unit 27, as the detailed information shown in FIG. 6.

As shown on the display screen 51 in FIG. 9, the detailed information for the print content is displayed, and the user is thereby able to refer to the subject matter of the print content, and to avoid printing out an undesired print content mistakenly, or the like.

Subsequently, the DTV viewer (user) refers to the information of the desired print content, and then he or she presses the OK button 60 on the interface panel if the information is the one the viewer desires, thereby causing that the print content to be selected and returning the procedure to step S116.

At step S120, the print data for the print content that is being selected on the display screen in FIG. 8 is acquired. If a plurality of print contents are selected, then the print data is acquired, for example, for a print content situated in the uppermost position in the print content list. More specifically, if the display on the display screen 51 is in the state shown in FIG. 8, then when the start button 58 is pressed, information indicating the pressing of the start button 58 is sent to the control unit 35 through the common bus 40. The control unit 35 then issues a control signal for acquiring print data for the selected print content, from the print content storage unit 27 of the DTV apparatus 21. This control signal is transmitted from the control unit 35 of the multi-function printer 31, through the common bus 40, the I/F unit 39 and the home network 11, and is inputted to the DTV apparatus 21 through the I/F unit 28 of the DTV apparatus 21. The inputted control signal is sent through the common bus 29 in the DTV apparatus 21 to the print content storage unit 27 in the data storage unit 26. Thereupon, the print data of the selected print content stored in the print content storage unit 27 is retrieved and is sent through the common bus 29 of the DTV apparatus 21 to the I/F unit 28, and then transmitted to the home network 11. The selected print data thus transmitted to the home network 11 is read in to the multi-function printer 31 through the I/F unit 39. This sequence of tasks is carried out in accordance with the control signal from the control unit 35 of the multi-function printer 31. In the present embodiment, step S120 corresponds to the operation of the print data acquisition device.

Thereupon, the procedure transfers to step S122, where printing is started. More specifically, the print data inputted to the multi-function printer 31 is sent to the print unit 34 through the common bus 39 in the multi-function printer 31. An image represented with the print data thus sent is printed onto a recording medium, such as paper, by the print unit 34.

Then, at step S124, it is judged whether or not the printing has normally completed. More specifically, if the printing has normally completed at step S122, then a signal indicating the completion of printing is sent from the print unit 34 through the common bus 40 to the control unit 35. On the other hand, if the printing has not been normally carried out at step S122 due to a problem with the print unit 34, then a signal indicating that the printing is not normally completed is sent from the print unit 34 through the common bus 40 to the control unit 35. At step S124, a judgment is made in accordance with this information.

More specifically, if the signal sent to the control unit 35 is the signal indicating that the printing has not normally completed, then at step S124, the control unit 35 judges that the printing is not normally completed, and the procedure transfers to step S126, where a print abnormality is displayed on the display screen 51 on the display unit 37 in the user I/F unit 36 of the multi-function printer 31.

On the other hand, if the signal transmitted to the control unit 35 indicates that the printing has normally completed, then at step S124, the control unit 35 judges that the printing has normally completed and the procedure transfers to step S128.

At step S128, the print data relating to the print content that has been printed at step S122 is erased, and information indicating completion of the printing is transmitted to the DTV apparatus 21. More specifically, the control unit 35 transmits the information indicating the completion of the printing to the user I/F unit 36 through the common bus 40, with respect to the content for which the printing has been completed at step S122, and the information in the memory section (not shown) of the multi-function printer 31 is changed in such a manner that when the print content list is shown on the display screen 51 on the display unit 37, the display indicating the print status of the print content is changed from "pending" to "completed". Furthermore, this information is sent from the control unit 35 to the I/F unit 36 of the multi-function printer 31 through the common bus 40, and is transmitted through the home network 11 to the I/F unit 28 of the DTV apparatus 21, and then sent through the common bus 29 to the print content storage unit 27 in the data storage unit 26. On the basis of this information, the information of the content for which printing has been completed in step S122 is changed from a "pending" state to a "completed" state.

Then, the procedure transfers to step S130. At step S130, it is judged whether or not printing has been completed for all of the print contents selected to be printed at step S116. At step S130, if it is judged that the printing has been completed for all of the print contents selected to be printed at step S116, then the printing operation terminates. On the other hand, if the printing has not been completed for the print contents selected to be printed at step S116, then the procedure returns to step S120, where print data for the selected print content situated in the uppermost position in the print content list is acquired from the DTV apparatus 21.

Next, the print environment settings of the multi-function printer 31 are described with reference to FIG. 10.

Figure 10:
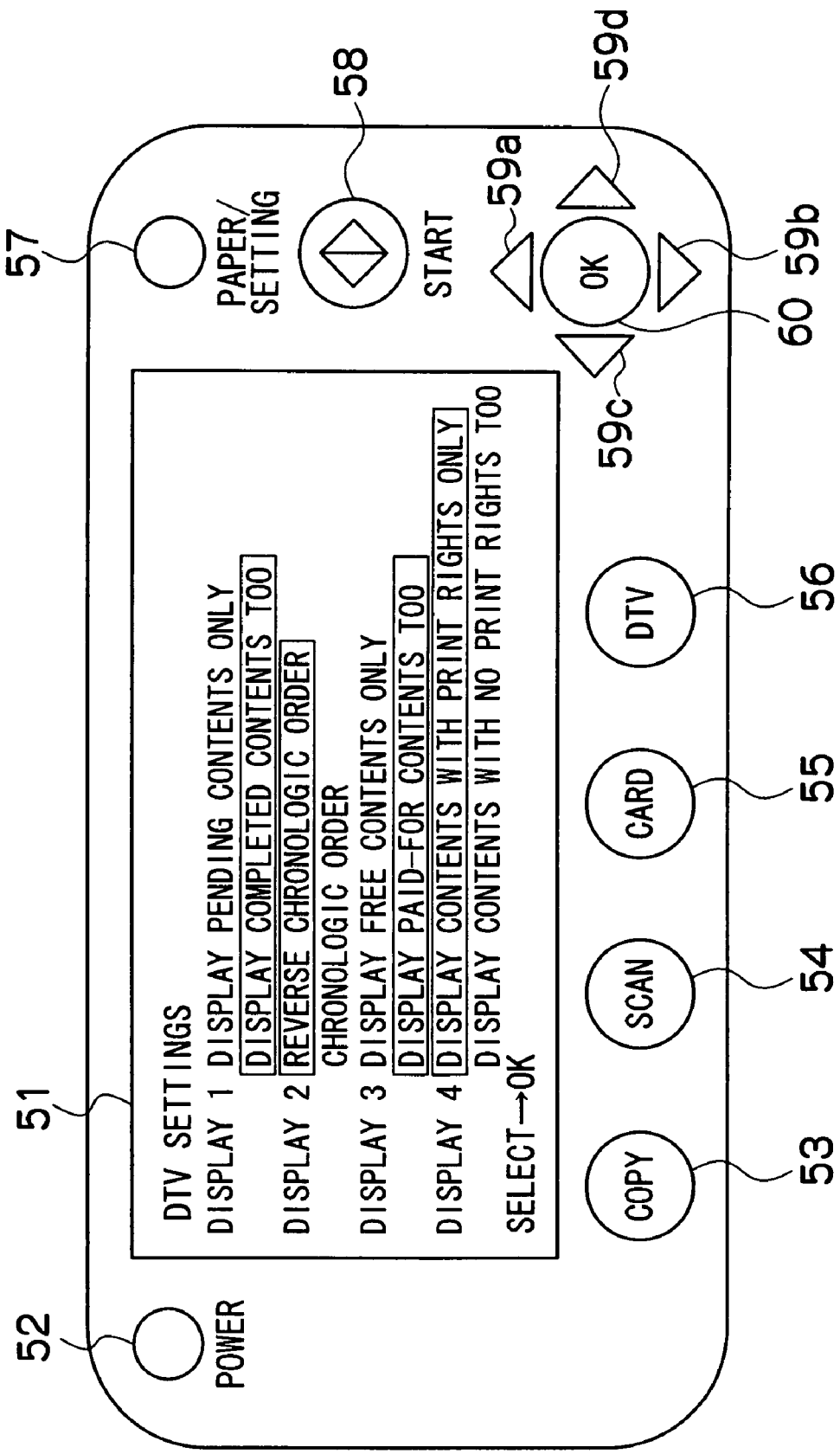
FIG. 10 is a schematic drawing showing a state of the interface panel of the printing apparatus, after a paper/setting button of the printing apparatus is pressed.

FIG. 10 is a diagram showing the state of the interface panel on the display unit 37 of the multi-function printer 31, after the paper/setting button 57 has been pressed in the state shown in FIG. 4. When the paper/setting button 57 is pressed, the display screen 51 shows the state of the print environment settings in the multi-function printer 31. More specifically, items relating to the print contents to be shown on the print content list, such as the selection of print contents to be displayed, the listing sequence of the print contents, and the like, are shown on the display screen 51, in such a manner that each item can be independently selected. By operating the item movement buttons 59*a*, 59*b*, 59*c* and 59*d*, and the OK button 60, it is possible to change the settings for the displayed items.

Next, a second embodiment of the present invention is described. In the second embodiment, the DTV apparatus 21 and the multi-function printer 31 having the same composition as those of the first embodiment are used, but the control procedure is different.

The sequence of print processing in the printing apparatus for printing data acquired through digital broadcasting according to the second embodiment is described below with reference to FIGS. 11 and 12.

In the second embodiment, the procedure starts from a state where the power supply to the multi-function printer 31 is switched off. FIG. 11 is a flowchart showing a sequence that starts with the power supply to the multi-function printer 31 being switched on.

Figure 11:
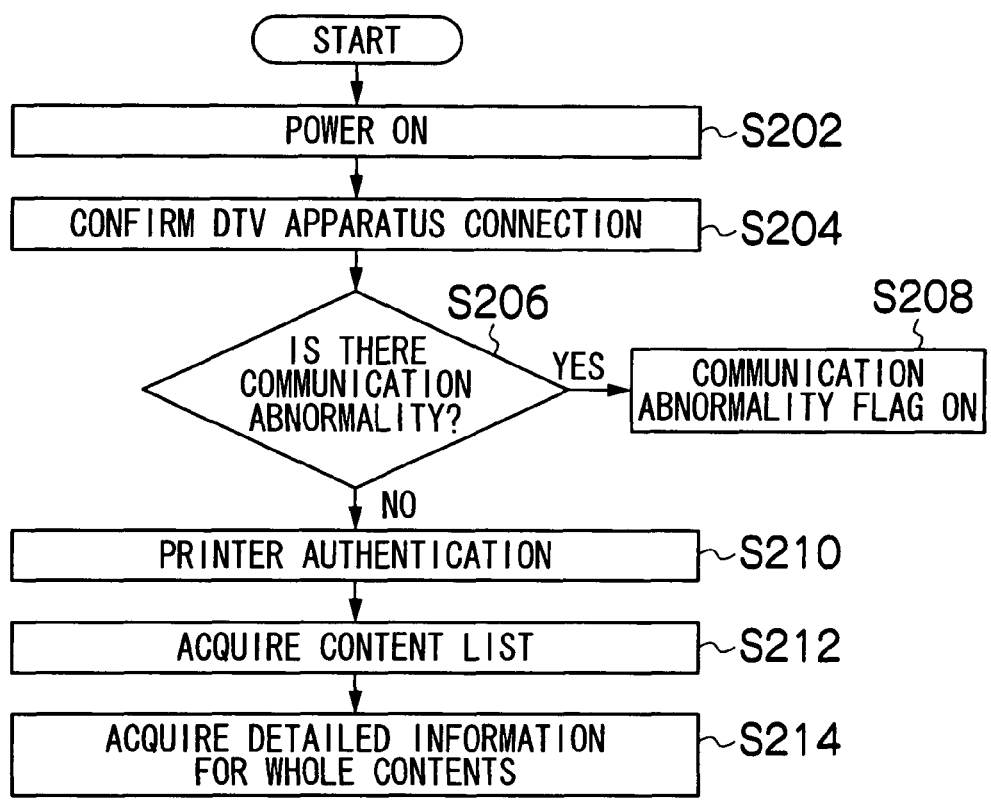
FIG. 11 is a flowchart showing the first part of a printing operation in the printing apparatus according to a second embodiment of the present invention.
Figure 12:
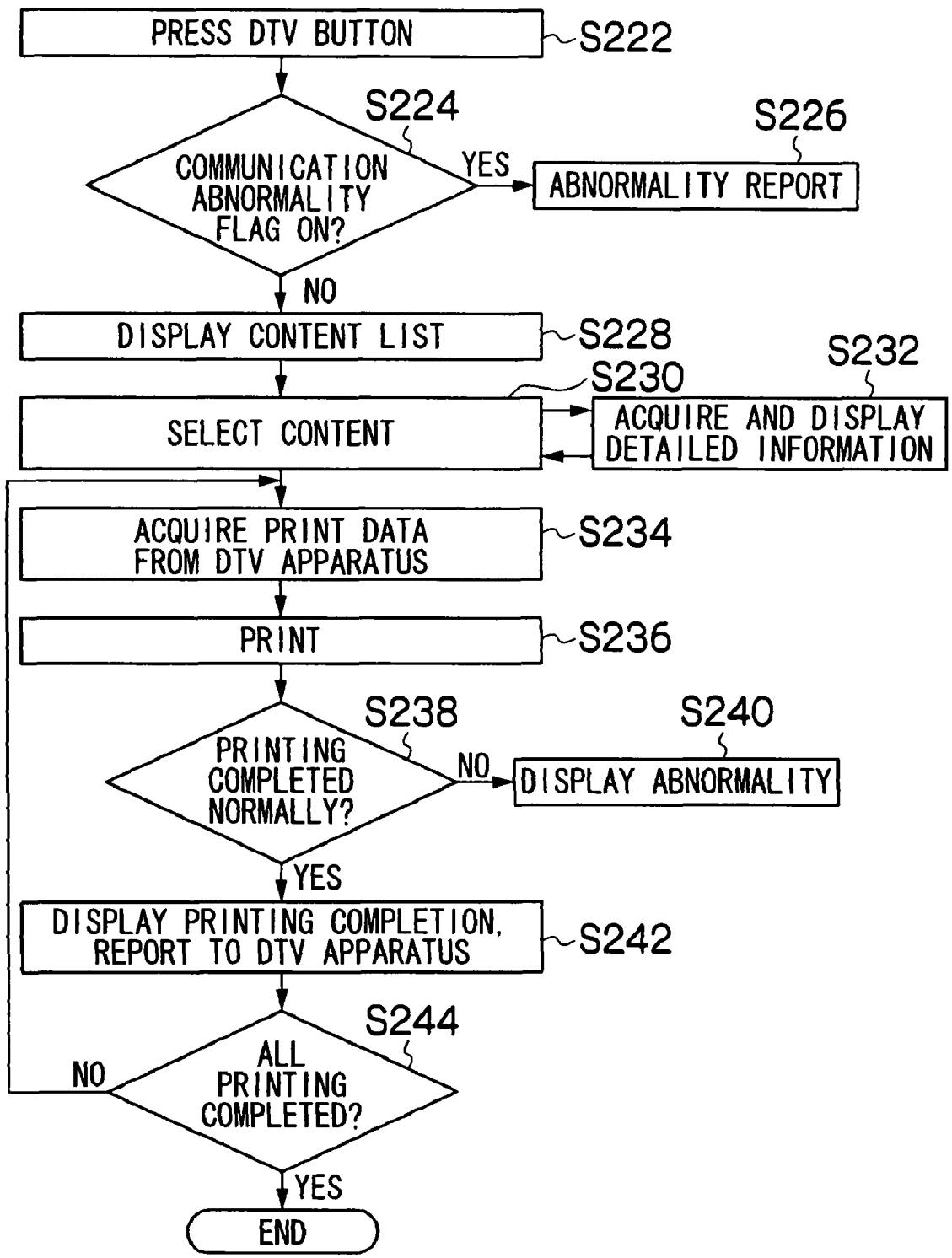
FIG. 12 is a flowchart showing the second part of the printing operation in the printing apparatus according to the second embodiment.

In this state, as shown in FIG. 11, the power supply to the multi-function printer 31 is switched on at step S202. More specifically, when the power button 52 on the interface panel of the multi-function printer 31 is pressed, a signal indicating that the power button 52 has been pressed is sent to the control unit 35, and the multi-function printer 31 is started up.

When the power button 52 is pressed, a confirmation task is carried out by the control unit 35 of the multi-function printer 31 through the I/F unit 39, in order to check that the multi-function printer 31 is in connection with the DTV apparatus 21 on the home network 11, as indicated in step S204.

Thereupon, at step S206, it is judged whether or not the communication status is abnormal. If there is a communication abnormality, such as an abnormality in the connection with the DTV apparatus 21, then a "communication abnormality present" judgment is made and the procedure transfers to step S208, where a communication abnormality flag is set to on-state in a memory section (not shown) of the multi-function printer 31. For example, the communication abnormality flag is set to on-state in cases where the DTV apparatus 21 is not in connection to the home network 11, or cases where the power supply of the DTV apparatus 21 is switched off.

On the other hand, if it is judged at step S206 that there is no abnormality in the connection with the DTV apparatus 21, then it is judged that there is "no communication abnormality" and the procedure transfers to step S210.

At step S210, an authentication procedure is carried out for the multi-function printer 31. The purpose of carrying out the authentication procedure is to limit the usable printer in order to restrict the use of paid-for contents, and in cases where the home network 11 includes a wireless connection rather than a wired connection, to prevent interference with neighboring home network circuits, in other words, to prevent the DTV apparatus 21 of the TV viewer from connecting mistakenly to another multi-function printer in a neighboring house. Registration of the printer for the purpose of authentication is carried out by the DTV apparatus 21. More specifically, when the DTV apparatus 21 and the multi-function printer 31 are initially connected to each other through the home network 11, a test print is carried out by the multi-function printer 31, and after confirming that there is no problem in the results of the test print, hardware information relating to the multi-function printer 31, for example, the MAC (Media Access Control) address, is registered in the DTV apparatus 21.

Thereupon, at step S212, a print content list in the DTV apparatus 21 is acquired by the multi-function printer 31 by means of a list acquisition device. More specifically, a control signal for acquiring the list of print contents stored in the print content storage unit 27 of the DTV apparatus 21 is transmitted from the control unit 35 of the multi-function printer 31 to the DTV apparatus 21 through the I/F unit 39 of the multi-function printer 31 and the home network 11. The control signal transmitted to the DTV apparatus 21 is inputted to the I/F unit 28 of the DTV apparatus 21, and is then sent to the print content storage unit 27 in the data storage unit 26 through the common bus 29. Thereupon, designated print content list information stored in the print content storage unit 27 is read out and transmitted to the home network 11 through the common bus 29 and the I/F unit 28.

The procedure then transfers to step S214. At step S214, the related information (attribute information) for all of the print contents (all of the contents listed in the print content list acquired at S212) is acquired and the print content list information is displayed. More specifically, when step S212 has been completed, the control unit 35 issues a control signal for obtaining information relating to all of the print contents (all of the contents listed in the print content list), from the print content storage unit 27 of the DTV apparatus 21. This control signal is transmitted from the control unit 35 of the multi-function printer 31 through the common bus 40, the I/F unit 39 and the home network 11, and is inputted to the DTV apparatus 21 through the I/F unit 28 of the DTV apparatus 21. The inputted control signal is sent through the common bus 29 in the DTV apparatus 21 to the print content storage unit 27 in the data storage unit 26. Thereupon, the information relating to all of the print contents stored in the print content storage unit 27 is transmitted through the common bus 29 and the I/F unit 28 of the DTV apparatus 21 to the home network 11. The related information for all of the print contents thus transmitted to the home network 11 is inputted to the multi-function printer 31 through the I/F unit 39, and is stored in the memory section (not shown) of the multi-function printer 31.

The operations described above are carried out when the power button 52 of the multi-function printer 31 is pressed.

Next, the sequence of processing for printing after pressing of the DTV button 56 on the multi-function printer 31 is described with reference to FIG. 12.

At step S222, the DTV button 56 on the interface panel of the multi-function printer 31 is pressed.

When the DTV button 56 is pressed, the control unit 35 of the multi-function printer 31 judges whether or not the communication abnormality flag is on-state in the memory section of the multi-function printer 31, as indicated at step S224. If it is judged that the communication abnormality flag is on-state, then the procedure transfers to step S226, where the existence of the abnormality is reported on the display unit 37 of the multi-function printer 31.

On the other hand, if it is judged at step S224 that the communication abnormality flag is not on-state, then it is determined that there is no communication abnormality and the procedure transfers to step S228.

At step S228, the print content list acquired by the list display device at step S212 is displayed on the display screen 51. More specifically, the print content list acquired by the multi-function printer 31 is sent to the user I/F unit 36 through the common bus 40, and then displayed on the display screen 51 on the display unit 37 of the interface panel. FIG. 4 shows the interface panel in this state. As shown in FIG. 4, the display screen 51 displays information relating to the print content list acquired from the print content storage unit 27 of the DTV apparatus 21. The information displayed here contains the program title, the broadcast date and time, the number of sheets of paper required if printing is to be carried out, and information indicating whether or not printing has already been carried out.

Moreover, an item that cannot be printed by the multi-function printer 31 being used, due to the attributes of the print content acquired from the print content storage unit 27 of the DTV apparatus 21, is separately displayed. FIG. 7 shows the interface panel in this state. As shown in FIG. 7, an "X" symbol is placed by item "5", and this indicates that printing is not possible with the multi-function printer 31 used at present. An example of a case where printing is not possible is one where the print content requires a sheet of the A3 size but the multi-function printer 31 currently used accepts exclusively sheets of the A4 size.

Thereupon, at step S230, the print content is selected by the TV viewer. More specifically, the TV viewer selects the print content displayed on the display screen 51 by operating the item movement buttons 59a and 59b and the OK button 60. FIG. 8 shows the state of the interface panel after this selection has been made. As shown in FIG. 8, frames are depicted about the print content items that are being selected.

If it is not necessary for the user to refer to the detailed information of the print content, then the user presses the start button 58, thereby transferring the procedure to step S234.

On the other hand, if the user wishes to refer to the detailed information relating to the print content, then the user selects the print content item for which he or she wishes to refer to the detailed information, by operating the item movement buttons 59a and 59b on the screen at step S116, and then presses the item movement button 59d, thereby transferring the procedure to step S232. More specifically, the user selects the print content item for which he or she wishes to refer to the detailed information, by operating the item movement buttons 59a and 59b, and presses the item movement button 59d, then the detailed information relating to the print content for which the user wishes to refer to the detailed information is displayed on the display screen 51. FIG. 9 shows the interface panel in this state.

As shown in FIG. 9, the display screen 51 displays the related information of the print content for which the user wishes to refer to the detailed information. Image information indicating the concrete state of the print content is displayed on the left-hand side of the display screen 51, and text-based information relating to the print content for which the user wishes to refer to the detailed information is displayed on the right-hand side of the display screen 51.

As shown on the display screen 51 in FIG. 9, the detailed information for the print content is displayed, and the user is thereby able to refer to the subject matter of the print content, and to avoid printing out an undesired print content mistakenly, or the like.

Subsequently, the DTV viewer (user) refers to the information of the desired print content, and then he or she presses the OK button 60 on the interface panel if the information is the one the viewer desires, thereby causing that the print content to be selected and returning the procedure to step S230.

At step S234, the print data for the print content that is being selected on the display screen in FIG. 8 is acquired. If a plurality of print contents are selected, then the print data is acquired, for example, for a print content situated in the uppermost position in the print content list. More specifically, if the display on the display screen 51 is in the state shown in FIG. 8, then when the start button 58 is pressed, information indicating the pressing of the start button 58 is sent to the control unit 35 through the common bus 40. The control unit 35 then issues a control signal for acquiring print data for the selected print content, from the print content storage unit 27 of the DTV apparatus 21. This control signal is transmitted from the control unit 35 of the multi-function printer 31, through the common bus 40, the I/F unit 39 and the home network 11, and is inputted to the DTV apparatus 21 through the I/F unit 28 of the DTV apparatus 21. The inputted control signal is sent through the common bus 29 in the DTV apparatus 21 to the print content storage unit 27 in the data storage unit 26. Thereupon, the print data of the selected print content stored in the print content storage unit 27 is retrieved and is sent through the common bus 29 of the DTV apparatus 21 to the I/F unit 28, and then transmitted to the home network 11. The selected print data thus transmitted to the home network 11 is read in to the multi-function printer 31 through the I/F unit 39. This sequence of tasks is carried out in accordance with the control signal from the control unit 35 of the multi-function printer 31. In the present embodiment, step S234 corresponds to the operation of the print data acquisition device.

Thereupon, the procedure transfers to step S236, where printing is started. More specifically, the print data inputted to the multi-function printer 31 is sent to the print unit 34 through the common bus 39 in the multi-function printer 31. An image represented with the print data thus sent is printed onto a recording medium, such as paper, by the print unit 34.

Then, at step S238, it is judged whether or not the printing has normally completed. More specifically, if the printing has normally completed at step S236, then a signal indicating the completion of printing is sent from the print unit 34 through the common bus 40 to the control unit 35. On the other hand, if the printing has not been normally carried out at step S236 due to a problem with the print unit 34, then a signal indicating that the printing is not normally completed is sent from the print unit 34 through the common bus 40 to the control unit 35. At step S238, a judgment is made in accordance with this information.

More specifically, if the signal sent to the control unit 35 is the signal indicating that the printing has not normally completed, then at step S238, the control unit 35 judges that the printing is not normally completed, and the procedure transfers to step S240, where a print abnormality is displayed on the display screen 51 on the display unit 37 in the user I/F unit 36 of the multi-function printer 31.

On the other hand, if the signal transmitted to the control unit 35 indicates that the printing has normally completed, then at step S238, the control unit 35 judges that the printing has normally completed and the procedure transfers to step S242.

At step S242, the print data relating to the print content that has been printed at step S236 is erased, and information indicating completion of the printing is transmitted to the DTV apparatus 21. More specifically, the control unit 35 transmits the information indicating the completion of the printing to the user I/F unit 36 through the common bus 40, with respect to the content for which the printing has been completed at step S236, and the information in the memory section (not shown) of the multi-function printer 31 is changed in such a manner that when the print content list is shown on the display screen 51 on the display unit 37, the display indicating the print status of the print content is changed from "pending" to "completed". Furthermore, this information is sent from the control unit 35 to the I/F unit 36 of the multi-function printer 31 through the common bus 40, and is transmitted through the home network 11 to the I/F unit 28 of the DTV apparatus 21, and then sent through the common bus 29 to the print content storage unit 27 in the data storage unit 26. On the basis of this information, the information of the content for which printing has been completed in step S236 is changed from a "pending" state to a "completed" state.

Then, the procedure transfers to step S244. At step S244, it is judged whether or not printing has been completed for all of the print contents selected to be printed at step S230. At step S244, if it is judged that the printing has been completed for all of the print contents selected to be printed at step S230, then the printing operation terminates. On the other hand, if the printing has not been completed for the print contents selected to be printed at step S230, then the procedure returns to step S234, where print data for the selected print content situated in the uppermost position in the print content list is acquired from the DTV apparatus 21. The related information is displayed in a similar pattern to that shown in FIG. 9, on the display screen 51 on the display unit 37 of the multi-function printer 31.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A printing apparatus for printing data acquired through digital broadcasting, the printing apparatus capable of being connected to a receiving apparatus through a network, the receiving apparatus receiving the data transmitted through the digital broadcasting and having a data storage device storing the received data, the printing apparatus comprising:
   a user interface which is operated by a user of the printing apparatus;
   a list acquisition device which acquires a print content list through the network in accordance with an operation on the user interface, the print content list being stored in the data storage device;
   a list display device which displays the print content list acquired by the list acquisition device; and
   a print data acquisition device with which a print object content to be printed is selected from the print content list displayed on the list display device, and which acquires, through the network, print data of the print object content from the data storage device in accordance with an operation on the user interface,
   wherein the printing apparatus prints the print data acquired by the print data acquisition device; and
   the printing apparatus is authenticated by the receiving apparatus to restrict use of print contents requiring fees to control charges for the print contents requiring fees.

2. The printing apparatus as defined in claim 1, wherein:
   the list acquisition device acquires detailed data for each print content contained in the print content list; and
   the list display device displays the detailed data acquired by the list acquisition device.

3. The printing apparatus as defined in claim 1, wherein when the print data acquired by the print data acquisition device has been normally printed, information that printing has been normally carried out is sent to the receiving apparatus.

4. The printing apparatus as defined in claim 1, wherein the print content list is selectively displayed on the list display device in accordance with attribute data of the print content.

5. The printing apparatus as defined in claim 1, wherein communication between the printing apparatus and the receiving apparatus is started when the list acquisition device sends a signal to acquire the print content list to the receiving apparatus.

6. The printing apparatus as defined in claim 1, wherein if communication between the printing apparatus and the receiving apparatus is in an abnormal state when the list acquisition device sends a signal to acquire the print content list to the receiving apparatus, then the printing apparatus outputs information of abnormality of the communication.

* * * * *